(12) United States Patent
Cozza et al.

(10) Patent No.: US 10,374,498 B2
(45) Date of Patent: Aug. 6, 2019

(54) ELECTRIC DRIVE UNIT PROVIDED WITH DRIVE OUTLETS THAT ARE OPERABLE INDEPENDENTLY TO EACH OTHER

(71) Applicant: AACO MANUFACTURING S.R.L., Sovizzo (Vicenza) (IT)

(72) Inventors: Roberta Cozza, Sovizzo (IT); Luicano Cozza, Altavilla Vicentina (IT); Marco Gattazzo, Sovizzo (IT)

(73) Assignee: AACO MANUFACTURING S.R.L., Sovizzo (Vicenza) (IT)

( * ) Notice: Subject to any disclaimer, the term of this patent is extended or adjusted under 35 U.S.C. 154(b) by 275 days.

(21) Appl. No.: 15/302,891

(22) PCT Filed: Apr. 7, 2015

(86) PCT No.: PCT/IB2015/052505
§ 371 (c)(1),
(2) Date: Oct. 7, 2016

(87) PCT Pub. No.: WO2015/155681
PCT Pub. Date: Oct. 15, 2015

(65) Prior Publication Data
US 2017/0040877 A1    Feb. 9, 2017

(30) Foreign Application Priority Data

Apr. 8, 2014 (IT) .............................. VR2014A0089

(51) Int. Cl.
*H02K 5/24* (2006.01)
*H02K 5/16* (2006.01)
*H02K 16/00* (2006.01)
*H02K 5/22* (2006.01)

(52) U.S. Cl.
CPC ............... *H02K 16/00* (2013.01); *H02K 5/16* (2013.01); *H02K 5/24* (2013.01); *H02K 5/225* (2013.01)

(58) Field of Classification Search
CPC ............. H02K 5/16; H02K 5/24; H02K 16/00
USPC ............................................. 310/51, 89, 116
See application file for complete search history.

(56) References Cited

U.S. PATENT DOCUMENTS

| 6,002,193 A * | 12/1999 | Canini | H02K 3/46 310/101 |
| 8,456,051 B2 * | 6/2013 | Raad | H02K 7/003 310/112 |
| 9,071,122 B2 * | 6/2015 | Neufeld | H02K 7/08 |

FOREIGN PATENT DOCUMENTS

| GB | 1496223 | 12/1977 |
| JP | 03089838 A * | 4/1991 |
| JP | H05116542 | 5/1993 |
| JP | H0698495 | 4/1994 |
| JP | 2006014477 | 1/2006 |

* cited by examiner

*Primary Examiner* — Jeremy A Luks
(74) *Attorney, Agent, or Firm* — Tutunjian & Bitetto, P.C.

(57) ABSTRACT

An electric motor unit includes a casing, a first electric motor and a second electric motor, housed within the casing, a drive shaft operatively connected to the first electric motor and a drive shaft operatively connected to the second electric motor, in which the drive shafts can be rotatably actuated in an independent way with respect to each other around a same rotational axis.

9 Claims, 3 Drawing Sheets

ELECTRIC DRIVE UNIT PROVIDED WITH DRIVE OUTLETS THAT ARE OPERABLE INDEPENDENTLY TO EACH OTHER

TECHNICAL FIELD OF THE INVENTION

The present invention refers to an electric motor unit equipped with two drives which can be rotatably actuated, around a same rotational axis, in an independent way with respect to each other.

STATE OF THE PRIOR ART

The use of electric motor units for the rotatable actuation, around a rotational axis, of mechanical devices is widespread in many different applications.

By way of example, such motor units can be employed in applications such as fans, in which a blade impeller is fitted at the end of a drive shaft that is externally extended from the electric motor unit, or in hydraulic pumps in which the impeller of the pump is operatively connected to a drive of the electric motor unit, e.g. to a hollow shaft that is extended therefrom, or other applications in which, generally, the rotatable actuation of a mechanical device is provided for.

Specific configurations of electric motor units are provided for, comprising a single drive shaft which is externally extended at opposite sides of the casing of the drive unit itself, thus supplying two drives, opposite each other, rotating with the same rotation direction around the same rotational axis.

Such configuration allows the simultaneous actuation of two different devices connected to the electric motor unit.

Nevertheless, an electric motor unit thus defined has several disadvantages, in consideration of the fact that the two drives are served by a single electric motor, thus requiring high electric power if the simultaneous actuation is provided for two separate mechanical devices which have considerable operating loads.

In addition, such configuration of the electric motor unit has a limited flexibility of use, since the actuation of the two drives occurs with the same parameters, with reference to the angular speed and acceleration, rotation direction, available power, etcetera.

That stated above constitutes a limit for the flexibility of use of one such electric motor unit.

There is therefore the need to improve the characteristics of the above-described electric motor units with particular reference to the flexibility of use of the same.

SUMMARY OF THE INVENTION

One object of the present invention is to improve the flexibility of use of an electric motor unit by supplying, in the same, two drives that can be independently actuated with respect to each other.

A further object of the present invention is to supply an electric motor unit comprising two drives, independent of each other, in the scope of an extremely efficient solution and with overall limited bulk.

Another object of the present invention is to supply an electric motor unit comprising two drives actuatable with the same rotation direction or with opposite rotation direction, and/or with the same rotation speed or with different rotation speeds.

A further object of the present invention is to supply an electric motor unit comprising two drives, independent of each other, that is easy to assembly and maintain.

In accordance with one aspect of the present invention, an electric motor unit is provided according to the present principles.

The present specification refers to preferred and advantageous forms of the invention.

BRIEF DESCRIPTION OF THE DRAWINGS

Further characteristics and advantages of the present invention will be clearer from the detailed description of a preferred but not exclusive embodiment of an electric motor unit, illustrated as a non-limiting example in the enclosed drawing tables, in which.

DETAILED DESCRIPTION OF THE INVENTION

Figure 1:
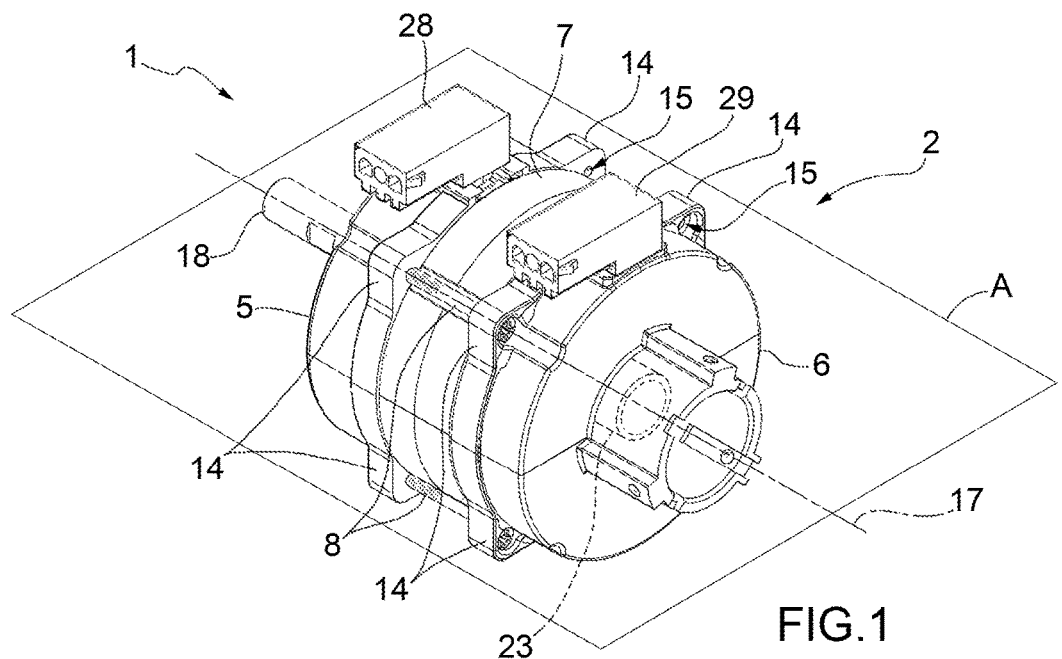
FIG. 1 is a slightly top perspective view of an electric motor unit according to the present invention.

With reference to the enclosed figures, the electric motor unit according to the present invention is indicated overall with the reference number 1.

The electric motor unit 1 comprises a casing 2, within which a first electric motor 3 and a second electric motor 4 are housed.

According to one aspect of the present invention, the first electric motor 3 and the second electric motor 4 are preferably of brushless type.

It is assumed that the structural characteristics and operating principles of such electric motor type are known and, therefore, so as to avoid an excessively long present description, the components of the electric motors 3 and 4 will be briefly indicated where deemed opportune, omitting the detailed description thereof.

The first electric motor 3 and the second electric motor 4 can have the same power or different powers with respect to each other, depending on the specific use requirements, without any limitation.

The casing 2 comprises a first half-shell 5, a second half-shell 6, and a spacer element 7 interposed, during use, between the first half-shell 5 and the second half-shell 6.

The first half-shell 5, the second half-shell 6 and the spacer element 7 can be removably connected to each other by means of connection means 8, as is better described hereinbelow.

Figure 2:
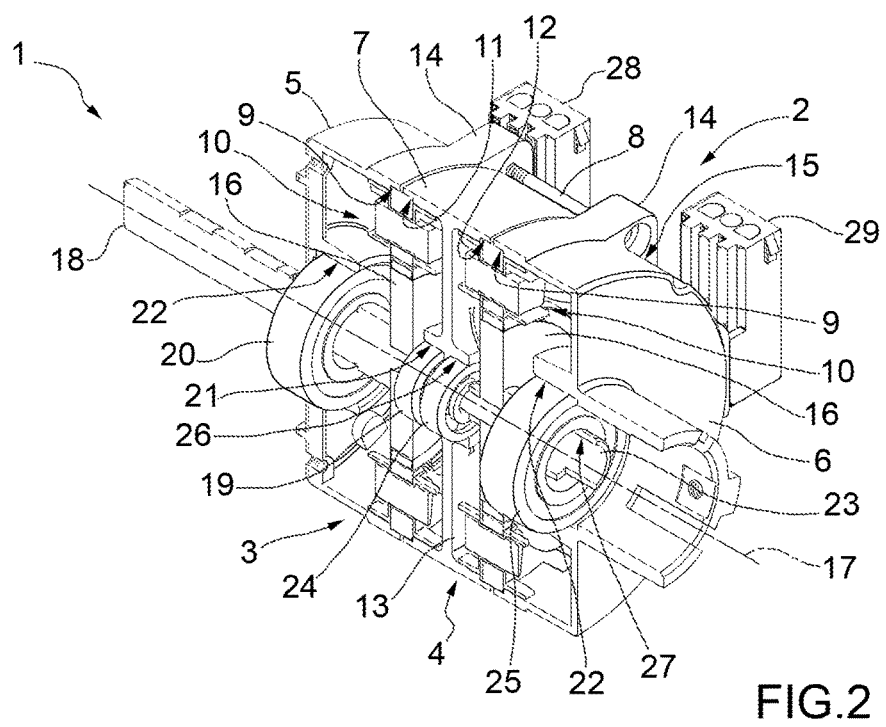
FIG. 2 is a perspective view, in partial section, along a section plane A, of the electric motor unit pursuant to FIG. 1.
Figure 3:
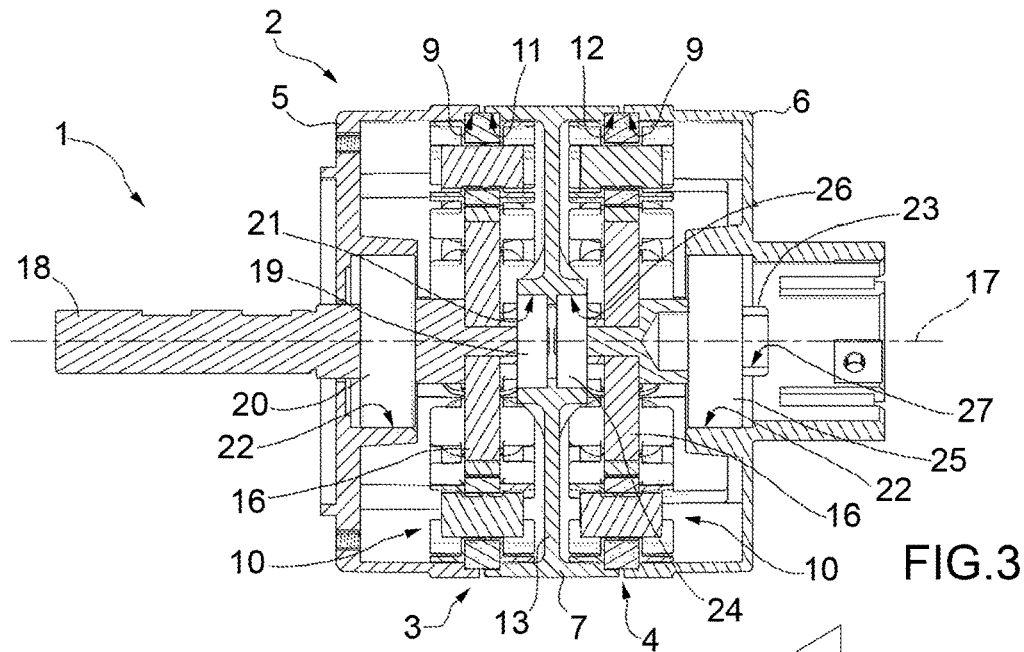
FIG. 3 is a front section view along the section plane A of the electric motor unit pursuant to FIG. 1.

Illustrated in FIGS. 2 and 3, by way of example, is a section view of the electric motor unit 1 along the section plane A, in order to facilitate the comprehension of the internal structure thereof.

The first half-shell 5 has, at the portion which during use faces the spacer element 7, an inner annular seat 9 for at least partially housing the stator winding 10 of the first electric motor 3 within the first half-shell 5.

Analogously, also the second half-shell 6 has, at the portion which during use faces the spacer element 7, an inner annular seat 9, for at least partially housing the stator winding 10 of the second electric motor 4.

In turn, the spacer element 7 has, at opposite end portions, which during use respectively face the first half-shell 5 and the second half-shell 6, a first inner annular seat 11 and a second inner annular seat 12 for at least partially housing the stator winding 10 of the first electric motor 3 and second electric motor 4, respectively.

With reference to that described above, the stator winding 10 of the first motor 3 is shut at the sides, in an interposed position, between the first half-shell 5 and the spacer element 7.

More precisely, the stator winding 10 of the first electric motor 3 is partly housed in the inner annular seat 9 of the first half-shell 5 and partly housed in the first inner annular seat 11 of the spacer element 7.

Analogously, the stator winding 10 of the second electric motor 4 is retained in a position interposed between the second half-shell 6 and the spacer element 7 and, more precisely, the stator winding 10 of the second electric motor 4 is at least partially housed in the inner annular seat 9 of the second half-shell 6 and in the second inner annular seat 12 of the spacer element 7.

In fact, by connecting the spacer element 7 to the first half-shell 5, and shutting them together, the stator winding 10 of the first electric motor 3 is firmly blocked within the casing 2.

Analogously, by connecting the spacer element 7 to the second half-shell 6 and shutting them together, by means of the connection means 8, the stator winding 10 of the second electric motor 4 is firmly blocked within the casing 2.

The spacer element 7, which has a substantially cylindrical form, can have an inner ribbing defining a partition separator 13 within the casing 2.

In fact, the partition separator 13, in addition to conferring a greater rigidity to the spacer element 7, defines, within the casing 2, two separate compartments for respectively housing the first electric motor 3 and the second electric motor 4.

The first half-shell 5 and the second half-shell 6 each have, on the outer part thereof, at least one pair of flanged elements 14.

Each flanged element 14, in turn, comprises a through opening 15 engageable by means of the connection means 8.

The connection means 8, e.g. screws or bolts, etcetera, are introduced into through openings 15 of the flanged elements 14 of the first half-shell 5 and of the second half-shell 6 and are removably constrainable thereto, by means of engaging a corresponding thread, thus allowing the connection of the first half-shell 5 with the second half-shell 6.

By operating on the connection means 8, therefore, the shutting of the first half-shell 5 and the second half-shell 6 against the spacer element 7 is determined, thus assembling the casing 2.

The connection means 8 allow a facilitated assembly/disassembly of the casing 2, during the production of the electric motor unit 1 reducing the required assembly times and, subsequently, the times of intervention on such unit, if it is necessary to carry out the maintenance thereof.

The first electric motor 3 comprises a stator winding 10, described above, operatively associated with an inner rotor 16, according to modes known in the field, adapted to be placed in rotation around a rotational axis 17.

The rotor 16 of the first electric motor 3 is constrained to a drive shaft 18, e.g. by means of fitting or by means of a key or equivalent solutions.

The rotation of the rotor 16 then causes the rotation of the drive shaft 18 around a rotational axis which coincides with the rotational axis 17 of the rotor 16 itself.

The drive shaft 18 is supported within the casing 2 by means of a pair of bearings 19, 20, specifically an inner bearing 19 and an outer bearing 20.

The inner bearing 19 is provided positioned within a first bearing seat 21 obtained at the central portion of the partition separator 13 of the spacer element 7, while the outer bearing 20 is positioned in a seat 22 obtained in the first half-shell 5.

It is observed that the stator winding 10 and the rotor 16 of the first electric motor 3, as well as the inner bearing 19 and the outer bearing 20, have a same rotational axis coinciding with the rotational axis 17.

In a manner analogous to that described relative to the first electric motor 3, the second electric motor 4 comprises a stator winding 10, operatively associated with an inner rotor 16 that is placed in rotation around the rotational axis 17.

The rotor 16 of the second electric motor 4 is constrained to a drive shaft 23, for example by means of fitting or a key or equivalent solutions.

The drive shaft 23 is supported within the casing 2 by means of a pair of bearings 24, 25, an inner bearing 24 and an outer bearing 25.

The inner bearing 24 is positioned in a second bearing seat 26 obtained at the central portion of the partition separator 13, in a position opposite that of the first bearing seat 21.

The outer bearing 25, analogous to that described for the outer bearing 20, is positioned in a seat 22 obtained inside the second half-shell 6.

It is also observed that the stator winding 10 and the rotor 16 of the second electric motor 4, as well as the inner bearing 24 and the outer bearing 25, have a same rotational axis coinciding with the rotational axis 17.

According to an embodiment illustrated in the FIGS. 1-3, the drive shaft 18 of the first electric motor 3 is of solid type, while the drive shaft 23 of the second electric motor 4 has, at the end provided for the connection with a device outside the casing 2 to be rotatably actuated, at least one hollow portion 27.

With reference to the end portion of the drive shafts 18 and 23 to be connected during use to devices to be rotatably actuated around the rotational axis 17, the solid or hollow conformation is provided in order to allow the connection thereof to devices or components that are different from each other, as a function of the fact that such devices or components have a seat in which the solid drive shaft is housed, e.g. an impeller, or a pin or a shaft to be connected to the hollow portion of the drive shaft, e.g. a pump.

According to a further version of the present invention, not illustrated in the figures, the drive shaft 18 of the first electric motor 3 has at least one hollow end portion, for the connection during use of the same to an external device to be rotated, while the drive shaft 23 of the second electric motor 4 is solid.

According to yet another version of the present invention, not illustrated in the figures, both drive shafts 18 and 23 comprise at least one hollow portion for the connection during use of the same to devices outside the electric motor unit 1, to be rotatably actuated.

In practice, the conformation of the drive shafts 18 and 23 can be of any type without any limitation, thus allowing increasing the flexibility of use of the electric motor unit 1 according to the present invention.

The drive shaft 18 of the first electric motor 3 and the drive shaft 23 of the second electric motor 4 can be rotatably actuated around the rotational axis 17 in an independent way with respect to each other, both as regards the rotation direction, which can be concordant or discordant, and as regards the angular speed and/or acceleration.

As indicated above, the electric motor unit 1 according to the present invention is characterized by high flexibility of use, since the mechanical devices or users operatively connected thereto can be independently actuated with respect to each other as a function of the specific use requirements.

By way of a non-limiting example, the electric motor unit 1 according to the present invention can be employed for actuating a fuel nebulizer pump and a fuel diffusion fan within a burner, or in ventilation means with opposite double blade for actuating the single blades aimed for fan and/or aspirator function, or in a mixer device.

Therefore, it is possible to optimize the electrical consumptions of the electric motor unit 1 within an extremely efficient and compact solution.

The overall bulk of the present invention is in fact limited, especially if compared with the overall bulk of two electric motor units of conventional type, each equipped with a single drive shaft.

The limited number of components thus allows limiting and reducing the overall production costs of the electric motor unit 1.

As mentioned above, the assembly of the electric motor unit 1 according to the present invention is particularly easy to carry out.

On such matter, it is observed that, according to one version of the present invention, the correct positioning and centering between the first half-shell 5, the spacer element 7 and the second half-shell 6 is facilitated by the presence of respective inner annular seats 9, 12.

During the assembly of the electric motor unit 1, in fact, the stator windings 10 of the first electric motor 3 and the second electric motor 4 which are respectively positioned between the first half-shell 5 and the spacer element 7 and between the second half-shell 6 and the spacer element 7, are engaged in respective inner annular seats 9, 12.

Thus, the stator windings 10 act as a guide and centering element during the assembly of the casing 2.

According to a further aspect of the present invention, the casing 2 comprises a first electric connector 28, operatively connected to the stator winding 10 of the first electric motor 3, for power supplying and operatively controlling the same.

In addition, the casing 2 comprises a second electric connector 29, operatively connected to the stator winding 10 of the second electric motor 4, for power supplying and operatively controlling the same.

The power supply and control of the first electric motor 3 and second electric motor 4 can occur due to a single control unit, not illustrated in the figures or by means of a pair of control units, each served by a single electric motor 3 or 4, according to modes known in the field.

Figure 4:
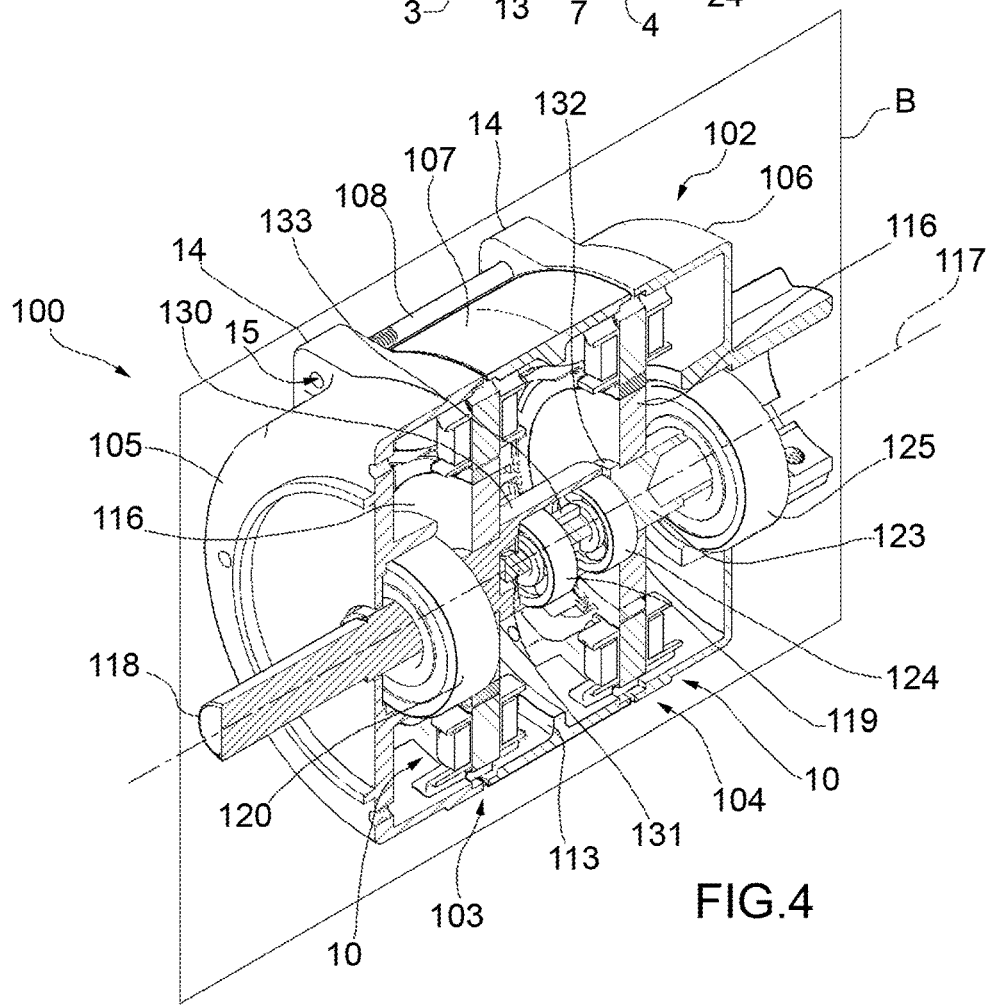
FIG. 4 is a perspective view in partial section of a further version of the electric motor unit according to the present invention.
Figure 5:
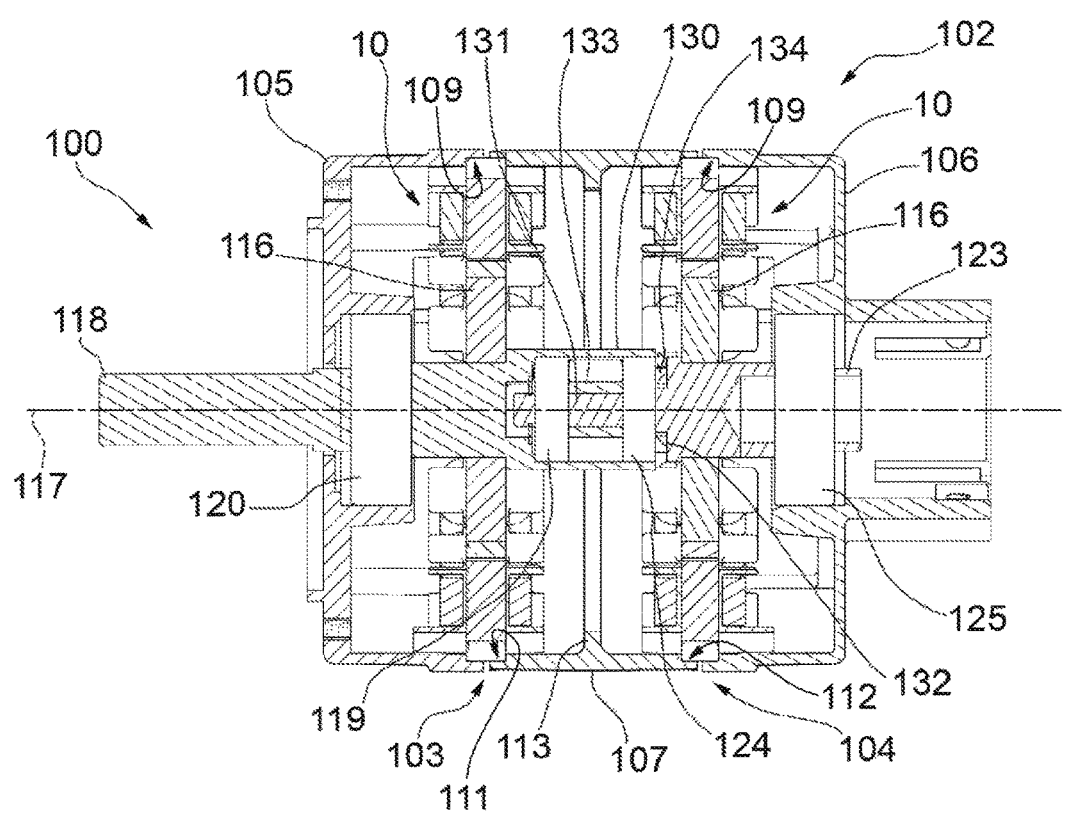
FIG. 5 is a section view, obtained along a section plane B, of the electric motor unit pursuant to FIG. 4.

A further embodiment of the electric motor unit according to the present invention is illustrated in FIGS. 4 and 5, and is indicated overall with the reference number 100.

For improved comprehension of the present description and enclosed figures, the components corresponding to those described for the preceding embodiment will be indicated with the same numbering plus 100.

The electric motor unit 100 differs from the previous embodiment with regard to the configuration of the support of the drive shaft 118 of the first electric motor 103 and of the drive shaft 123 of the second electric motor 104 within the casing 102.

Hereinbelow, the description of the electric motor unit 100 will be limited to the components that differ from the preceding embodiment; with regard to the analogous components, reference is made to the description of the preceding embodiment.

Illustrated in FIG. 4 is a perspective view in partial section of the electric motor unit 100, along a section plane B.

The casing 102 comprises a first half-shell 105, a second half-shell 106 and a central spacer element 107 interposed between the first half-shell 105 and the second half-shell 106.

Analogous to the preceding embodiment, the first half-shell 105, the second half-shell 106 and the spacer element 107 can be removably connected to each other by means of connection means 108 (FIG. 4).

The first half-shell 105 has, at the portion which during use faces the spacer element 107, an inner annular seat 109 for at least partially housing the stator winding 10 of the first electric motor 103 within the first half-shell 105.

Analogously, also the second half-shell 106 has, at the portion which during use faces the spacer element 107, an inner annular seat 109, for at least partially housing the stator winding 10 of the second electric motor 104.

In turn, the spacer element 107 has a first inner annular seat 111 and a second inner annular seat 112 for at least partially housing the stator winding 10 respectively of the first electric motor 103 and of the second electric motor 104, analogous to that described for the preceding embodiment.

The spacer element 107 has a substantially cylindrical conformation, comprising at least one reinforcement ribbing 113 at its interior.

According to one version of the present embodiment, the height of the reinforcement ribbing 113 could be such to substantially constitute a separator of partial division of the inner volume of the casing 102, in such case defining two compartments for housing a first electric motor 103 and a second electric motor 104.

The first electric motor 103 comprises a drive shaft 118 supported by an outer bearing 120.

Analogously, the second electric motor 104 comprises a drive shaft 123, supported rotating by means of an outer bearing 125.

Between the drive shafts 118 and 123, a rotating connection is provided that is adapted to allow the independent rotation therebetween, as is better described hereinbelow.

With the expression "independent rotation", it is intended the possibility for the two drive shafts 118 and 123 to rotate with concordant or discordant rotation direction and with the same rotation speed or with different rotation speeds.

The drive shaft 118 has, at the end inside the casing 102, a section 130 that is at least partially hollow.

Such section 130 can have an outer diameter greater than the remaining portion of the drive shaft 118, thus supplying an abutment shoulder for the rotor 116 of the first electric motor 103.

Coaxial with the section 130, in a position within the same, an end section 131 of the drive shaft 123 of the second electric motor 104 is housed.

The end section 131 can have an outer diameter smaller than the remaining portion of the drive shaft 123, thus defining a shoulder 132 for positioning an inner bearing along the end section 131, as is better described hereinbelow.

The drive shaft 118 is operatively connected to the drive shaft 123 by means of at least one rotating bearing 119, 124.

With reference to the embodiment illustrated in the FIGS. 4 and 5, the drive shaft 118 is connected to the drive shaft 123 by means of two inner bearings 119 and 124.

In particular, the outer ring of the inner bearings 119 and 124 is engaged with the inner surface of the section 130 of the drive shaft 118, while the inner ring of the inner bearings 119 and 124 is engaged along a portion of the end section 131 of the drive shaft 123.

According to one version of the present invention, the inner ring of the inner bearing 124 can be arranged in abutment against the shoulder 132 obtained at the end section 131, and blocked in position thereto.

Between the inner bearings 119 and 124, a spacer element 133 can be supplied which during use is adapted to maintain a predefined distance between the same along the end section 131.

In fact, analogously to the preceding embodiment, the drive shafts 118 and 123 can rotate independently from each other around the same rotational axis 117, with concordant or discordant rotation direction, and with equal or different actuation speed in rotation.

Between the end of the section 130 of the drive shaft 118, which faces the drive shaft 123, and the shoulder 132, an elastic ring 134 can be supplied that is adapted to dampen and absorb possible vibrations that may arise during use between the two drive shafts 118 and 123, facilitating greater efficiency, silence and stability in the operation of the electric motor unit 100.

Hence, also the electric motor unit 100 allows attaining the same aims of the preceding embodiment, with particular reference to the flexibility of use, efficiency and assembly/disassembly simplicity.

The two drive shafts 118 and 123 can be actuated to rotate around the rotational axis 117 with the same rotation direction or with different directions, with the same rotation speed or with speeds different from each other, facilitating a use of the electric motor unit 100 according to the present invention that is extremely flexible.

Furthermore, the overall number of components of the electric motor unit 100 is limited, if compared with that of two separate electric motor units that are each equipped with a single drive shaft.

This translates into significant economical savings both during production and use.

The invention thus conceived is susceptible of numerous modifications and variants, all falling within the protective scope of the inventive concept.

In addition, all details can be substituted with other technically equivalent elements. In practice, the materials used, as well as the contingent shapes and sizes, can be of any type depending on the requirements, without departing from the protective scope of the following claims.

The invention claimed is:

1. An electric motor unit comprising a casing, a first electric motor and a second electric motor, housed within said casing, said first electric motor comprising a first stator winding and said second electric motor comprising a second stator winding, a first drive shaft, which can be rotatably actuated around a rotational axis, operatively connected to said first electric motor, a second drive shaft, which can be rotatably actuated around said rotational axis, operatively connected to said second electric motor, said casing comprising a first half-shell, a second half-shell, and a spacer element interposed between said first half-shell and said second half-shell, said first half-shell, said second half-shell and said spacer element being removably connectable to each other by means of connection means, wherein said first electric motor is housed in a position interposed between said spacer element and said first half-shell and said second electric motor is housed in a position interposed between said spacer element and said second half-shell, wherein in that said first half-shell has, at the portion which during use faces said spacer element, an inner annular seat for at least partially housing said first stator winding of said first electric motor and said second half-shell has, at the portion which during use faces said spacer element an inner annular seat for at least partially housing said stator winding of said second electric motor, said spacer element has at opposite end portions which during use respectively face said first half-shell and said second half-shell, a first inner annular seat and a second annular seat for at least partially housing respectively said stator winding of said first electric motor and said second electric motor.

2. The electric motor unit according to claim 1, wherein said drive shaft of said first electric motor and said drive shaft of said second electric motor are rotatably supported in an independent way with respect to each other in said casing, by means of bearings.

3. The electric motor unit according to claim 1, wherein said first half-shell and said second half-shell each have, on the outer part thereof, at least one pair of flanged elements provided with a through opening.

4. The electric motor unit according to claim 3, wherein said means for removably connecting said first half-shell with said spacer element and with said second half-shell are configured engageable in said through openings of said flanged elements of said first half-shell and of said second half-shell.

5. The electric motor unit according to claim 1, comprising first electric connectors operatively connected to said first electric motor and second electric connectors operatively connected to said second electric motor for independently power supplying and operatively controlling said first electric motor and said second electric motor.

6. The electric motor unit according to claim 1, wherein said first drive shaft of said first electric motor and said second drive shaft of said second electric motor are operatively connected together, coaxially, through a rotating connection adapted to allow said drive shafts to rotate around said rotational axis independently.

7. The electric motor unit according to claim 6, wherein said first drive shaft of said first electric motor comprises an end section, at least partially hollow, positioned inside said casing, for housing at least one inner bearing.

8. The electric motor unit according to claim 7, wherein said at least one inner bearing comprises an outer annular element engaged with said partially hollow section and an inner annular element engaged with an end section of said second drive shaft of said second electric motor.

9. The electric motor unit according to claim 7, comprising an elastic ring coaxially interposed between the end section of said first drive shaft and said second drive shaft of said second electric motor, for dampening and dissipating, during use, possible vibrations between said drive shafts.

* * * * *